United States Patent
Stefan et al.

(10) Patent No.: US 10,739,258 B2
(45) Date of Patent: Aug. 11, 2020

(54) DEVICE THAT GENERATES SALT-STATE INFORMATION OF A ROAD

(71) Applicant: FORD GLOBAL TECHNOLOGIES, LLC, Dearborn, MI (US)

(72) Inventors: Frederic Stefan, Aachen NRW (DE); Uwe Gussen, Huertgenwald NRW (DE); Christoph Arndt, Moerlen Rheinland-Pfalz (DE); Frank Petri, Erftstadt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 15/718,985

(22) Filed: Sep. 28, 2017

(65) Prior Publication Data

US 2018/0095034 A1    Apr. 5, 2018

(30) Foreign Application Priority Data

Sep. 30, 2016    (DE) .................. 10 2016 219 029

(51) Int. Cl.
*G06F 3/14*    (2006.01)
*G06K 9/00*    (2006.01)
(Continued)

(52) U.S. Cl.
CPC .......... *G01N 21/455* (2013.01); *B60K 35/00* (2013.01); *G01N 27/043* (2013.01); *G01N 29/043* (2013.01); *G01N 29/14* (2013.01); *G01S 17/89* (2013.01); *G01S 17/95* (2013.01); *G06F 3/14* (2013.01); *G06K 9/00798* (2013.01); *B60C 2019/004* (2013.01); *B60K 2370/16* (2019.05); *B60K 2370/48* (2019.05); *B60Y 2400/30* (2013.01); *B60Y 2400/308* (2013.01);
(Continued)

(58) Field of Classification Search
None
See application file for complete search history.

(56) References Cited

U.S. PATENT DOCUMENTS 8,768,573 B2    7/2014    Breed
9,551,616 B2 *   1/2017    McQuilkin .......... G01J 3/2823
(Continued)

FOREIGN PATENT DOCUMENTS

CN    202795755 U    3/2013
CN    103413441 B    12/2015
WO    2013173911 A1   11/2013

*Primary Examiner* — Nathan J Flynn
*Assistant Examiner* — Christen A Kurien
(74) *Attorney, Agent, or Firm* — Gregory P. Brown; Brooks Kushman P.C.

(57) ABSTRACT

In order to obtain information about a salt-state of a road independently of drivers, a method that generates information about the salt-state of a road is specified that includes a determination of salt-state-dependent measurement values, processing of the measurement values into information about the salt-state of the road and outputting of the information about the salt-state of the road. A corresponding device that generates information about the salt-state of a road comprises sensors that determine of salt-state-dependent measurement values, a processing unit that is configured to process determined measurement values into information about the salt-state of the road, and output the information about the salt-state of the road.

8 Claims, 1 Drawing Sheet

(51) Int. Cl.
- *G01N 21/45* (2006.01)
- *G01S 17/95* (2006.01)
- *G01N 29/14* (2006.01)
- *B60K 35/00* (2006.01)
- *G01N 27/04* (2006.01)
- *G01N 29/04* (2006.01)
- *G01S 17/89* (2020.01)
- *G01N 21/47* (2006.01)
- *G01S 15/88* (2006.01)
- *B60C 19/00* (2006.01)

(52) U.S. Cl.
CPC . *G01N 21/4738* (2013.01); *G01N 2291/2692* (2013.01); *G01S 15/885* (2013.01); *G06K 9/00791* (2013.01); *G09G 2380/10* (2013.01); *Y02A 90/19* (2018.01)

(56) References Cited

U.S. PATENT DOCUMENTS

2004/0188190 A1* 9/2004 Niwa ............... F16D 65/0025
  188/73.37
2015/0166072 A1 11/2015 Powers \* cited by examiner

DEVICE THAT GENERATES SALT-STATE INFORMATION OF A ROAD

CROSS-REFERENCE TO RELATED APPLICATIONS

This application claims foreign priority benefits under 35 U.S.C. § 119(a)-(d) to DE Application 10 2016 219 029.6 filed Sep. 30, 2016, which is hereby incorporated by reference in its entirety.

TECHNICAL FIELD

The disclosure concerns a method and a device configured to generate information about a salt-state of a road.

BACKGROUND

Winter road conditions are often hard to estimate and can be challenging to drivers of vehicles. In particular, at temperatures below 4° C., the current road conditions can often be difficult to estimate, because, for example, icing of roads, or formation of black ice in patches.

To prevent formation of ice, or thaw already formed ice, de-icing salt, also referred to as road salt, for example in the form of dry salt, pre-wetted salt or salt solution, i.e. an aqueous solution of salt, also referred to as brine, is often applied to roads.

De-icing salt usually has a high component of sodium chloride. In addition, for example, calcium sulfate, magnesium sulfate or other minerals may be contained within the de-icing salt. Calcium chloride, magnesium chloride and potassium chloride are also used as an alternative to sodium chloride, or in suitable mixtures, for example.

The action of the de-icing salt is based on molar melting point reduction, a chemical-physical effect, by which as the freezing point of a liquid decreases, the more particles are dissolved therein. Accordingly, the freezing point of a solution depends upon the present salt concentration. Because of a thawing effect and prevention of initial formation of ice on roads, requires that a certain minimum salt concentration must be present to prevent the freezing process at a prevailing ambient temperature. Consequently, it can be necessary to change the amount of de-icing salt, and, thereby, the salt concentration as a function of the ambient temperature.

To date it is not possible to obtain adequate information about the current salt-state of a road. Only in the case in which the driver of the vehicle can directly observe the application of the de-icing salt or is in a position to distinguish salt from ice particles can they derive some information about the salt-state of the road.

In particular, regarding future autonomous driving in self-propelled vehicles, it is however desirable to obtain information about the salt-state of a road independently of the drivers of vehicles, which information can then be passed to the self-propelled vehicle in order, for example, to enable the manner of driving to match the road conditions, and, thereby, increase safety for all road users.

Also, regarding the described dependency of the melting point reduction on the salt concentration, it is desirable to obtain information about the current salt-state of a road.

SUMMARY

A "road" according to the disclosure is any entity that is suitable for traveling with non-rail-bound land vehicles, for example streets, freeways, cycle routes.

"Salt-state" is the physical-chemical property of a road, in particular a surface thereof, that is affected by the use of de-icing salt.

The salt-state can be characterized via using "salt-state values". "Salt-state values" are indicators that describe the direct properties of the salt-state, for example the salt concentration, the size and the size distribution of salt particles, the component of the salt that is present in a certain form (dissolved, undissolved, finely distributed, clumped, crystallized etc.) and the distribution of the salt on the road.

"Information" about the salt-state of a road is a subset of knowledge about the salt-state that can be derived from the salt-state values. Such information is, for example, the classification of whether the salt concentration is adequate regarding the freezing point reduction in order to prevent the formation of ice on the road, or the indication of the maximum speed that should be chosen for a vehicle when traveling on the road. The time taken to apply the de-icing salt to the road is also an example of such information.

The basic idea of the present disclosure is, using various sensors, to determine measurement values from which information about the salt-state of a road can be derived. The information obtained can, for example, be passed to a self-propelled vehicle, so that said vehicle can adjust the manner of driving thereof to the prevailing road conditions.

According to the disclosure, salt-state-dependent measurement values are initially determined, i.e. measurement values that enable conclusions regarding the use of de-icing salt. For example, this can include the electrical conductivity of liquids on the road or in the water spray thrown up by a vehicle, the pH value of the water on the highway or of the water spray, the sound produced by the surface of the road and any salt particles present, the scattering of light on the surface of the road and any salt particles present, the current required for power steering (servo current) and a recorded image of the road surface.

One or more similar and/or different types of measurement values can be determined. Similar means a plurality of measurement values of the same type, for example a plurality of light scatter measurement values or a plurality of conductivity measurement values. Different types of measurement values is a plurality of measurement values of different type, for example a light scatter measurement value and a conductivity measurement value. Likewise, a plurality of similar types of measurement values, for example a plurality of light scatter measurement values and one or a plurality of different types, for example one or a plurality of conductivity measurement values, can also be determined.

A plurality of measurement values can be determined at separate locations and/or times, for example. As a result, not only point information about the salt-state of a road is obtained, but information is obtained about the salt-state within a specifiable section of a route and/or over a specifiable time interval, for example in order to be able to assess the development of the salt-state over time.

In addition to the salt-state-dependent measurement values, other measurement values can be determined that are not salt-state-dependent, but the measurement values can be used for the processing described below, for example. Such other measurement values can be the temperature or the air humidity, for example.

The determined salt-state-dependent measurement values themselves are generally not direct information about the salt-state, because, for example, neither a direct determination of the salt concentration, for example the mass concentration by determining the mass, nor a direct determination of the freezing point of a liquid present on the road is possible.

The determined salt-state-dependent measurement values are therefore then processed into information about the salt-state of the road, for example, by correlation with each other, with further measurement values, or by comparison with previously found dependencies.

In the simplest case, the processing can consist of the direct assignment of information to a measurement value. Thus, the adequate or inadequate presence of de-icing salt can be directly concluded from a conductivity measurement value by comparing a measured conductivity value with tabulated conductivity measurement values with which said information has already been associated.

However, the processing of the measurement values can also involve the association of the measurement values with a defined salt-state value and the derivation of information based on the salt-state value.

The association of the measurement values with a defined salt-state value can, for example, involve a calculation of the salt concentration from a determined conductivity measurement value. The measurement values obtained can be compared with corresponding databases that enable the association of the measurement value with a salt-state value.

Optionally, as the first processing step, initially an average value, for example an arithmetic or geometric average value or the median, can be determined from a plurality of similar measurement values, with which either information is directly associated or a salt-state value is initially associated.

There is also the possibility of associating a salt-state value with each measurement value, of forming an average value from the obtained salt-state values and then deriving information from said average value.

A combination is also possible, i.e. for example for the case in which conductivity measurement values are determined via using two conductivity sensors, average values of the measurement values of each conductivity sensor can initially be formed and each can be associated with a salt-state value, for example a salt concentration. Then, from the salt-state values an average value is also formed, from which the information about the salt-state is then derived.

The direct association of information with measurement values and/or the association of salt-state values with measurement values and/or the association of information with salt-state values can also be carried out in a matrix-based manner, i.e. information or a salt-state value is not associated with a measurement value or salt-state value, but the association is carried out based on a combination of various types of measurement values or salt-state values that form a matrix.

The association of the salt-state values or information can then be carried out via a database produced for the matrix.

As a result of this, any cross effects for the case in which a measurement value or salt-state value is influenced by another measurement value or salt-state value, or in which measurement values or salt-state values influence each other, can be better taken into account, whereby the accuracy of the association can be increased, so that ultimately more precise information can be obtained. For example, as a result temperature dependency of the electrical conductivity can be better taken into account by including temperature measurement values and conductivity measurement values in carrying out the association of the salt-state value with a matrix.

In a further step of the method, the previous information obtained about the salt-state of the road is output, for example via visual displays or audible signals. The output can for example be carried out to drivers of vehicles or monitoring staff.

Furthermore however, the output of the information can also be carried out to control units, for example an on-board electrical system control unit, which for example use the information as input data to derive recommendations for the adjustment of the driving manner for the drivers of vehicles or to directly control the vehicle accordingly, i.e. for example to adjust the speed of the vehicle to the salt-state.

Using the method according to the disclosure, for example, it can be possible to determine whether there is de-icing salt on the road, the state of the salt (for example when the de-icing salt was applied; whether the conductivity has already reduced, i.e. whether the de-icing salt has dissolved; whether the amount of de-icing salt is sufficient to achieve the desired reduction in the freezing point), whether the de-icing salt was applied as a solution of salt or whether the de-icing salt is no longer capable of preventing the formation of ice, for example owing to the temperature, ice that is already present, because the application of the de-icing salt was too late.

The output information can also be used to decide about a further application of de-icing salt to the road, for example while taking into account the current and predicted weather conditions.

In different embodiment versions, the processing of the measurement values can include the determination of a probability value. This can also be output as information, for example.

The probability value can provide an indication of how reliable the information obtained is, for example by providing an indication of the scatter of a plurality of similar measurement values or the deviation of the information obtained based on various types of measurement values.

In different embodiment versions, the processing of the measurement values, for example the association the measurement values with salt-state values, can be carried out via a pattern recognition algorithm. Said algorithm can be implemented to be self-learning, i.e. for example to use a self-learning database.

In further embodiment versions, the processing of the measurement values, for example the association of the measurement values with salt-state values and the derivation of information about the salt-state, can be carried out using hidden Markov models and/or Kalman filters and/or expectation maximization algorithms.

In further embodiment versions, the processing of the measurement values can be cloud-based, i.e. can be carried out via a computer cloud. For example, the determined measurement values can be transferred to a cloud. In the cloud, the measurement values can then be processed into information. A cloud can also be used for outputting the information, for example by outputting the information from the cloud to a display, for example the display of a smartphone or a navigation system.

According to further embodiment versions, the salt-state-dependent measurement values can be determined via an optical method, an acoustic method, determination of the conductivity, determination of the acceleration capability and/or electrical force feedback.

Optical methods include all methods here that operate with electromagnetic radiation in the visible or non-visible wavelength range. This includes, for example, laser radiation, infrared radiation and ultraviolet radiation.

For determining salt-state-dependent measurement values, electromagnetic radiation can be emitted towards the road. Following interaction with the road and any salt particles, the reflected or scattered radiation component is detected. Thus, for example, the specific scattering of light from salt crystals can be recorded as a measurement value.

For example, LIDAR (Light Detection and Ranging) can be used as an optical method. An associated LIDAR system emits laser pulses and detects the backscattered light.

For processing the scattered light measurement data, a hidden Markov model can be used. Said model can determine the specific reflection of salt crystals using a comparison with values contained in a database and the probability of a related salt-state of the road and can make the measurement values available for further processing.

For example, a pattern recognition algorithm can initially be used to obtain salt-state values as a reference, for example for a dry road, slightly salted road etc.

According to further embodiment versions, salt-state-dependent measurement values can be determined via a camera that can be switched between infrared and RGB (red, green, blue) recording via microsystem technology, wherein this is also an optical method.

Using said specific embodiment of the method, it is possible to analyze the effect described above of the melting point reduction by producing recordings of the road surface that indicate a dry or wet state of the road. If, for example, a wet state of the road can be detected at temperatures below 0° C., then it can be concluded therefrom that sufficient de-icing salt is present.

Furthermore, salt-state-dependent measurement values can be determined via an acoustic method. Additional microphones may be able to be used for this in order to determine corresponding sound patterns. The sound patterns can then be used as measurement values to be able to decide between salt, sand and other particles according to suitable measurement value processing, such as, for example, using ultrasonic sensors and microsystem technology.

Moreover, sound-in-solid transducers can be used to convert mechanical oscillations (vibrations) into electrical signals, which are then analyzed.

The obtained sound or vibration patterns can be processed via a pattern recognition algorithm to obtain information about the salt-state of the road. Optionally, self-learning databases can be used for this. Further, optionally, the processing of the measurement values can be carried out in a cloud-based manner.

According to further embodiment versions, salt-state-dependent measurement values can be determined via determination of the electrical conductivity. From the conductivity, the number of ions and hence the salt concentration can be estimated. A suitable conductivity sensor can, for example, be integrated within the running surface of a vehicle tire. There is a possibility of expanding already present sensors that monitor tire pressure so that they can also transmit other data, such as for example the electrical conductivity.

According to further embodiment versions, salt-state-dependent measurement values can be determined by determining acceleration. As the surface quality of the road can affect the acceleration of the vehicle, in the case of otherwise constant conditions the salt-state of the road can be concluded from a changed acceleration.

According to further embodiment versions, salt-state-dependent measurement values can be determined via electrical force feedback. In the case in which the road is covered with de-icing salt, the force feedback of the steering changes. Accordingly, a greater steering boost may be necessary. As a result, a power feed deviating from normal road conditions can be necessary in the case of electrical, electrohydraulic or electromechanical power steering. Through analysis of the necessary power feed, a specific pattern can be determined and compared with reference patterns to obtain information about the salt-state of the road.

According to further embodiment versions, salt-state-dependent measurement values can be determined from road water spray. When the road is being traveled by a vehicle, liquid can be thrown up (vehicle water spray), from the composition of which the salt-state of the road can be concluded, for example by measuring the conductivity and/or the pH value of the vehicle water spray.

According to further embodiment versions, the specific pattern that can form on the windscreen by the stirring up and deposition of the vehicle water spray (Schlieren image) can be used to obtain measurement values. The Schlieren image, for example the color of the water, the size and color of the salt particles), can be recorded with a camera. The salt-state of the road can be concluded by image processing and pattern recognition algorithms.

According to further embodiment versions, the salt-state-dependent measurement values can be determined from a vehicle, for example a motor vehicle or bicycle. This can enable the determination of the salt-state on the section of the road that is currently being traveled on, so that adaptation of the driving manner to the current state is possible. In addition, it is possible to determine the position of the vehicle via GPS (Global Positioning System) and thus to obtain spatially resolved information about the salt-state of the road.

A device according to the disclosure that generates information about the salt-state of a road, for example suitable for carrying out the method according to the disclosure, comprises sensors that determine salt-state-dependent measurement values. In this case, this can be one, or a plurality of similar or different types of sensors, i.e. sensors that can determine one or a plurality of similar or different types of measurement values as described above.

Furthermore, the device according to the disclosure comprises a processing unit (processor) that is designed to process the determined measurement values into information about the salt-state of the road.

Regarding the processing of the determined measurement values into information about the salt-state of the road, also refer to the above embodiments.

In addition, the device according to the disclosure comprises an output device that outputs the information about the salt-state of the road. In this case, it can be for example a visual display or an audible signal.

According to various embodiments, the processing unit can be designed so that the processing of the measurement values includes the association of the measurement values with salt-state values and the derivation of information about the salt-state of the road from the salt-state values.

According to various embodiments, at least one sensor that determines salt-state-dependent measurement values can be implemented as an optical sensor, an acoustic sensor, a pH value sensor, a conductivity sensor, an acceleration sensor or as a sensor for the determination of electrical force feedback. Optionally, a plurality of similar or different types of sensors can form a sensor cluster.

As optical sensors, for example sensors can be used that analyze electromagnetic radiation in the visible or non-visible range, for example laser radiation, ultraviolet radiation or infrared radiation, after interaction with the surface of the road and salt particles disposed thereon. For example, sensors can be used, using which the scattering of light can be analyzed.

For example, microphones can be used as acoustic sensors that record the noise profile when traveling on the road. The salt-state of the road can be concluded from the noise profiles by using pattern recognition algorithms.

According to various embodiment versions, a camera can be used as an optical sensor that can be switched via microsystem technology between infrared and RGB recording. Via such a sensor, in particular the appearance of the road surface can be examined and analyzed. Thus, for example, it can be determined whether the surface appears wet. If this is the case at temperatures below 0° C., then the amount of de-icing salt is sufficient to reduce the freezing point accordingly.

Furthermore, a camera for recording a Schlieren image produced by vehicle water spray on a windscreen can also be used as an optical sensor. Following the recording of the image by the camera, the properties of the Schlieren image (color of the water, size and color of the salt particles) can be processed via image processing and pattern recognition algorithms to obtain information about the salt-state.

According to various embodiment versions, the device according to the disclosure can comprise one, or a plurality of sound-in-solid transducers as acoustic sensors. As mentioned above, these can be used to convert mechanical oscillations, for example of the body, into electrical signals. In comparison to microphones, in this case any interference noise of the surroundings is of minor importance, because said noise cannot normally or can hardly affect the mechanical oscillations.

According to various embodiment versions, a conductivity sensor can be integrated within the running surface of a vehicle tire. Vehicle tires are often already fitted with transmitters and receivers, in order, for example, to monitor the tire pressure. Such devices can be expanded to additionally determine the conductivity and transmit the same to a processing unit.

According to various embodiments, the device can be implemented to communicate with a control unit, in particular an on-board electrical system control unit. Such a control unit can use the information about the salt-state as input data, in order, for example, to control the driving behavior of the vehicle, i.e. to adapt the speed to the salt-state for example.

Furthermore, a control unit can combine and process the information about the salt-state with further information, for example about the vehicle itself (acceleration capability, braking capability, tire condition etc.) or about the road (width, number and frequency of bends, traffic volumes, data on previous accidents etc.), in order to then output corresponding recommendations to the drivers of vehicles or to control the vehicle itself accordingly.

According to the disclosure, the information output according to the method described above can be used as input data for a self-propelled motor vehicle, for example as a replacement for the experience and instructions of an actual driver.

Together with further data, such as for example the specific vehicle properties, the input data can be used to obtain comprehensive information about the current conditions, which can then be used for a corresponding adaptation of the driving manner of the vehicle.

The disclosure will be described in detail below using an exemplary embodiment, wherein reference is made to the accompanying drawings, which form part of the disclosure and in which for illustration specific embodiments are shown in which the disclosure can be applied.

It is understood that other embodiments can be used and structural or logical changes can be made without departing from the scope of protection of the present disclosure. It is understood that the features of the various exemplary embodiments described herein can be combined with each other if not specifically stated otherwise. The following detailed description is therefore not to be taken as restrictive, and the scope of protection of the present disclosure is defined by the accompanying claims.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

According to an exemplary embodiment, information about the salt-state of a road that is being traveled along by a self-propelled automobile is generated.

Figure 1:
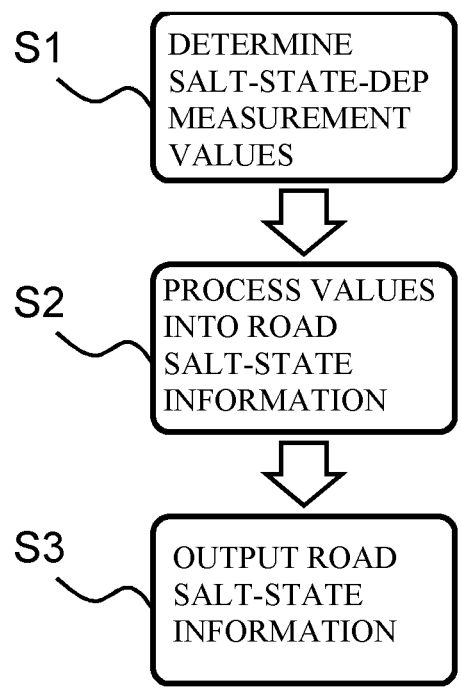
FIG. 1 is a flow chart of a method according to the disclosure.

According to the disclosure, initially salt-state-dependent measurement values are determined, i.e. measurement values that allow conclusions to be drawn regarding the use of de-icing salt. In the present exemplary embodiment, salt-state-dependent measurement values are determined by determining the electrical conductivity of the liquid disposed on the road on the one hand, and recording the Schlieren image formed on the windscreen of the automobile by the vehicle water spray via a camera (S1 in FIG. 1) on the other hand. For the determination of the electrical conductivity, in this case an average value is formed of conductivity values measured by a plurality of sensors.

In addition or alternatively, the pH value of the water on the highway or of the water spray, the sound produced by the surface of the road and any salt particles present, the scattering of light on the surface of the road and on any salt particles present, the current required for the power steering (servo current) and a recorded image of the road surface are used as measurement values.

Besides the salt-state-dependent measurement values, further measurement values can be determined that are not salt-state-dependent, but for example that can be used for the subsequent processing of the measurement values. Such further measurement values can be the temperature or the air humidity for example.

The electrical conductivity of the liquid on the road that is determined in the exemplary embodiment and the Schlieren image arising from the vehicle water spray itself are not direct information about the salt-state. The electrical conductivity and the Schlieren image are, therefore, processed into information about the salt-state of the road, for example by correlation with each other, with further measurement values or by comparison with previously discovered dependencies (step S2 in FIG. 1).

In the simplest case, the processing can consist of direct association of information with a measurement value. Thus, for example, from a conductivity measurement value a direct conclusion can be drawn regarding the adequate or inadequate presence of de-icing salt, for example by comparing a measured conductivity value with tabulated conductivity measurement values, with which said information has already been associated.

The processing of the measurement values can however also include the association of the electrical conductivity and of the Schlieren image with a defined salt-state value and the derivation of information based on the salt-state value. The association of the electrical conductivity and of the Schlieren image with a defined salt-state value can for example include the calculation of the salt concentration from the determined conductivity measurement value. The measurement values obtained can be compared with corresponding databases that enable the association of the measurement value with a salt-state value.

There is also the possibility of associating both the electrical conductivity and the Schlieren image with a respective salt-state value, of forming an average value from the obtained salt-state values and then deriving information from said average value.

A combination is also possible, i.e. for example for the case in which conductivity measurement values are determined via two conductivity sensors, initially average values of the measurement values of each conductivity sensor can be formed and can each be associated with a salt-state value, for example a salt concentration. An average value can also be formed from the salt-state values, from which the information about the salt-state is derived.

The direct association of information with measurement values and/or the association of salt-state values with measurement values and/or the association of information with salt-state values can also be carried out based on matrices, i.e. for example a matrix is formed, in which the column indices represent different values of the conductivity and the row indices represent different temperatures. Each matrix entry then corresponds to a salt-state value or information, and is associated with a conductivity and temperature pair represented by the respective index. As a result of this, any cross effects for the case in which a measurement value or salt-state value is affected by another measurement value or salt-state value or measurement values or salt-state values influence each other, are better taken into account. In the present example, as a result the temperature dependency of the electrical conductivity can be taken into account better.

In a further step of the method S3, the previous information obtained about the salt-state of the road is output, for example via a visual display or an audible signal. The output can for example be carried out to drivers of vehicles or to monitoring staff.

Furthermore however, the output of the information can also be carried out to control units of a vehicle, for example an on-board electrical system control unit, which, for example, use the information as input data to derive recommendations for adjustment of the driving manner for the drivers of vehicles, or to directly control the vehicle accordingly, i.e. for example to adapt the speed of the vehicle to the salt-state.

Figure 2:
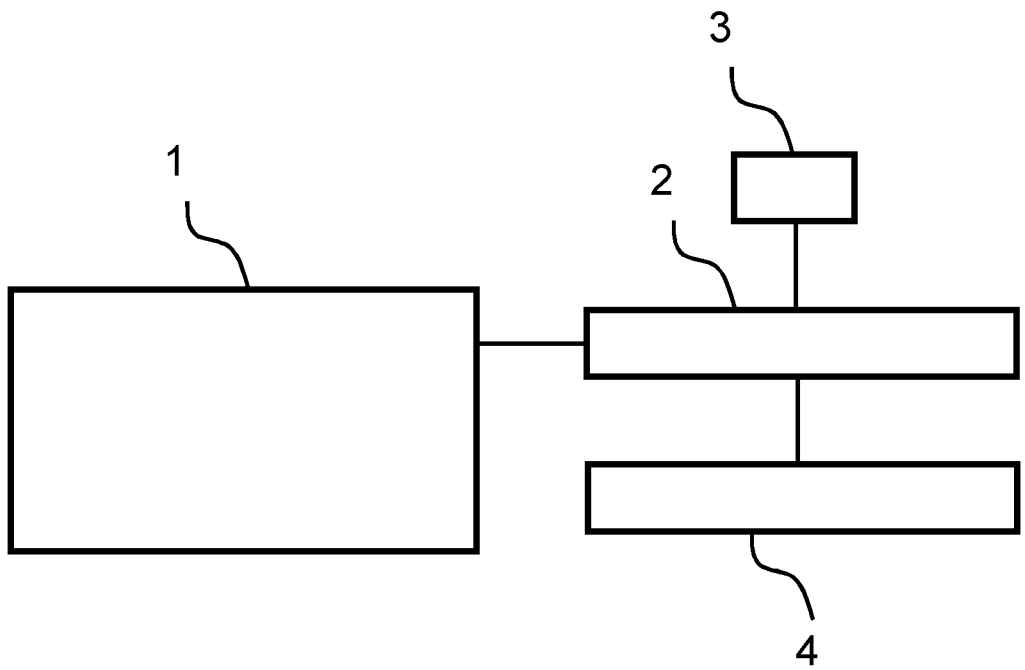
FIG. 2 is a schematic representation of a device according to the disclosure.

On the equipment side, there are sensors 1 that determine salt-state-dependent measurement values for carrying out the method (FIG. 2). In the present exemplary embodiment, the sensors include a conductivity sensor integrated within the running surface of a vehicle tire and a camera as an optical sensor. Via the conductivity sensor, the conductivity, for example, is determined in five individual measurements, of which the arithmetic average value is formed, which is processed in a processing unit 2 together with the recorded Schlieren image into information about the salt-state of the road via a processing unit 2. In one embodiment version, initially a defined salt concentration as a salt-state value is associated with the average value of the conductivity in the processing unit 2 on the one hand, and on the other hand the recorded Schlieren image is analyzed via a pattern recognition algorithm, which can optionally be implemented as self-learning, in order to likewise obtain the salt concentration as a salt-state value from the Schlieren image. During the association of the salt concentration with the average value of the conductivity, for example via the matrix described above, an external temperature during the conductivity measurement can be taken into account. The temperature measurement values required for this are obtained via a temperature sensor 3.

From both salt concentrations, while taking into account the current temperature of the road surface, it is derived in the processing unit 2 whether the salt concentration is sufficient for the desired melting point reduction, i.e. whether the formation of ice can be prevented.

The information about the salt-state of the road is output in a further step of the method via a display 4 as an output means. In addition, said information is used as an input data element for a self-propelled automobile by outputting the information to the on-board electrical system control unit, which then adapts the speed of the automobile to the salt-state of the road.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method that generates information about the salt-state of a road including:
   determining salt-state-dependent measurement values through road water spray;
   processing the measurement values into information about a salt-state of the road using hidden Markov models, Kalman filters and expectation maximization algorithms; and
   outputting the information.

2. The method as claimed in claim 1 further comprising associating the measurement values with salt-state values and deriving information about the salt-state of the road from the salt-state values.

3. The method as claimed in claim 1, wherein determining salt-state-dependent measurement values is through optical method, acoustic methods, electrical conductivity measurements, acceleration capability and electrical force feedback measurements.

4. The method as claimed in claim 3, wherein the optical method is Lidar.

5. The method as claimed in claim 1, wherein the road water spray produces a Schlieren image on a windscreen in determining salt-state measurement values.

6. A road salt-state information generating device, comprising:

a camera configured to determine salt-state-dependent measurement values through recordation of a Schlieren image on a windscreen produced by vehicle water spray;

a processor configured to translate the measurement values into salt-state information about the road; and an output device configured to display the salt-state information.

7. A method that generates information about the salt-state of a road including:

determining salt-state-dependent measurement values;

processing the measurement values into information about a salt-state of the road; and outputting the information, wherein the determining of salt-state-dependent measurement values is through optical method, acoustic methods, electrical conductivity measurements, acceleration capability and electrical force feedback measurements.

8. The method as claimed in claim 7, wherein the optical method is Lidar.

* * * * *